United States Patent [19]
Gillis

[11] 4,068,177
[45] Jan. 10, 1978

[54] ELECTRONIC CONTROL CIRCUIT

[75] Inventor: James A. Gillis, Lynchburg, Va.

[73] Assignee: General Electric Company, Lynchburg, Va.

[21] Appl. No.: 632,538

[22] Filed: Nov. 17, 1975

[51] Int. Cl.² .............................................. H04B 1/06
[52] U.S. Cl. ............................ 325/492; 340/171 PF; 343/225; 325/322; 340/311
[58] Field of Search ............... 325/492, 322, 466, 392; 340/171 PF, 311; 343/225

[56] References Cited
U.S. PATENT DOCUMENTS

| Re. 28,222 | 11/1974 | Wycoff | 325/492 |
|---|---|---|---|
| 3,488,596 | 1/1970 | Webster | 325/492 X |
| 3,599,100 | 8/1971 | Ward | 325/492 |
| 3,611,156 | 10/1971 | Ward | 325/492 |
| 3,670,242 | 6/1972 | McGarvey | 325/55 |
| 3,694,755 | 9/1972 | Ward | 325/392 |
| 3,774,114 | 11/1973 | Dahlgren | 325/492 |

Primary Examiner—Harold I. Pitts
Attorney, Agent, or Firm—Michael Masnik

[57] ABSTRACT

A communication receiver for receiving speech and sequential control tones wherein a pulser circuit is provided and rendered operative in a predetermined manner to produce a pulse pattern for intermittently rendering the receiver operative. The receiver comprises a tunable filter for selecting the desired control tones and detector circuits for detecting said control tones to provide a plurality of control signals. Said control signals are employed to control the pulser circuit to render the receiver operative to receive speech and control tones in a predetermined manner. The tunable circuit is responsive to said detected control tones for having its tuning changed to sequentially receive said control tones.

15 Claims, 4 Drawing Figures

– – – – → 61 OR 62 CLOSED

ELECTRONIC CONTROL CIRCUIT

BACKGROUND OF THE INVENTION

The present invention is directed to paging receivers and particularly to receivers which respond to predetermined paging codes to control on-off operation of the receiver to conserve battery life and to provide other control functions desirable in paging receiver operation.

There exist paging receivers on the market today which are used for selectively paging desired stations in accordance with predetermined tone groupings or paging codes of tone encoded paging signals. Selective paging provides an attractive way of paging stations or personnel without disturbing or distracting other personnel and without requiring the constant monitoring of all paging calls made. In such selective paging systems, carrier waves are usually broadcast from a central transmitter and are modulated with different paging codes or tone groupings as well as speech. The tone groupings in one common arrangement involve a plurality of tones transmitted sequentially in a predetermined order or code. In such paging systems the encoded paging signals are transmitted to a plurality of receivers carried by or located in the vicinity of the personnel to be paged. Each receiver is preset to respond to only one particular tone or paging grouping when such is present or modulated on the carrier wave transmitted from the central transmitter. Specifically, each receiver detects all encoded paging signals transmitted at the central transmitter and applies them to its peculiar or distinct decoder section. If the encoded received paging signal corresponds to the preset paging code for the receiver in question, control signals are caused to be generated. These control signals may be utilized for various purposes such as controlling pulsed operation of the receiver tuning a filter for selecting the various control tones included in the code, producing audible or visual signals, and coupling the received speech to a loudspeaker or other indicator, etc.

In the past problems have arisen in trying to accommodate tones which are closely spaced in frequency. Problems manifest themselves in having the circuitry respond to tones other than the desired tones, which is referred to as "falsing". This would result in the detection of a call which is not desired and result in that particular receiver being unnecessarily engaged. One way of resolving this problem is to utilize high Q circuits to detect the tone frequencies. A characteristic of high Q circuits is that they tend to respond relatively slow to incoming tones. Where a pulser circuit is employed for controlling the operative periods of a receiver, such slow response could result in undesirable operation of the pulser circuit and defeat the purpose of a battery saver since it results in the on/off ratio of battery application being too low for desirable receiver operation.

Accordingly, it is one object of this invention to provide an improved battery saving circuit for paging receivers.

Another object of this invention is to provide an improved circuit for generating control signals to control pulsed operation of the receiver portion and the tuning of a selective filter employed in detecting coded pulse tones.

Another object of this invention is to provide a pulser circuit for use in a pager wherein high Q tone decoding circuits are employed.

Another object of this invention is to provide an improved arrangement for selectively decoding sequential tones to obtain control signals.

Another object of this invention is to provide an arrangement for controlling paging receiver operation and particularly controlling the pulsed battery operation, selective tone tuning and indication thereof.

SUMMARY OF THE INVENTION

In accordance with one embodiment of the present invention there is provided a receiving circuit for receiving modulated carrier signals involving speech and sequential tones and detecting the control tones. A pulser circuit is coupled to the receiving circuit and rendered operative to produce a series of pulses for intermittently rendering the receiving circuit operative. A decoder circuit coupled to the receiving circuit responds to a first control tone in a series of control tones for generating a first control signal having a duration which is a function of the duration of the first control tone and a second control signal which occurs substantially upon the termination of the first control tone and continues for a predetermined interval thereafter. The decoder circuit also responds to a subsequent control tone for generating a third control signal. The pulser circuit responds to the first control signal to furnish a continuous supply voltage for operating the receiver for the duration of the first control tone. The pulser also responds to the second control signal to furnish a continuous supply voltage to render the receiver operative for at least said predetermined time interval to receive said subsequent tone. An electronic circuit is rendered responsive to the third control signal to provide an enabling signal prior to utilization by a utilization circuit in a desired manner.

BRIEF DESCRIPTION OF THE DRAWINGS

A complete understanding of the invention and fuller appreciation of its objects and features will be available from the following detailed description which is made in conjunction with the drawings of a particular illustrative embodiment wherein.

DESCRIPTION OF THE PREFERRED EMBODIMENT

Figure 1:
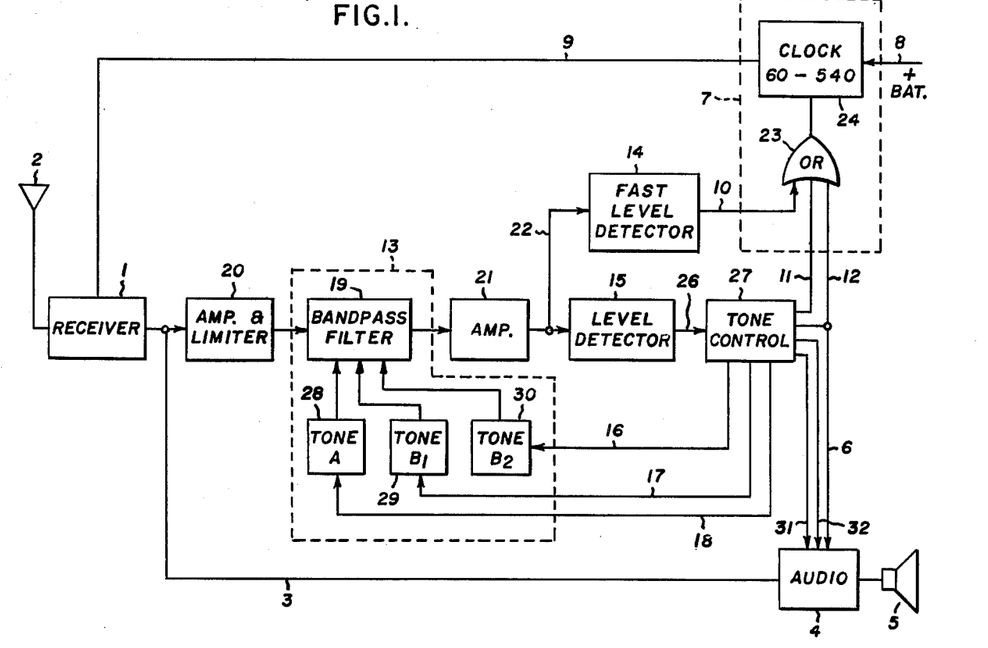
FIG. 1 illustrates in block diagram form one embodiment of the present invention.

Before entering into a description of the arrangement of FIG. 1, it might be well to provide some background to paging receivers and their application. As previously mentioned, paging receivers are employed to contact personnel or stations located in remote areas. To permit selective paging, the speech signals are coded control tones, identifying the address of the particular party to be contacted. Such receivers are carried about and usually are sufficiently small to be carried in the hand. One item of considerable expense in the operation of such receivers is the cost of the batteries employed to operate them. The purpose of battery saver circuits is to reduce receiver standby current drain thereby extending battery life. One common method for extending battery life is to pulse the receiver on intermittently at a given rate during the standby period and to render the receiver operative with continuous power during a decode cycle leading to an intended speech communication. In the particular embodiment described herein, the receiver is connected to the battery for 60 milliseconds out of 600 milliseconds utilizing a free running clock. This effectively reduces the standby current by a factor of ten to one. In such an application the object is to stop the clock in the "on" position when valid tones are received and to hold it in the on position until the desired communication has been effected. Also, the invention will be described in terms of a sequential tone system wherein a first tone of substantially one second duration is transmitted followed by a second tone of substantially one second duration with a interval therebetween on the order of 200 milliseconds. Under these circumstances it is the one second tone period that limits the receiver "off" time to 600 milliseconds. In a situation where the tone decoder in the receiver is of high Q, such as for example in order to resolve tones which are closely spaced apart in frequency, it may take as long as 300 milliseconds to decode the tone. This decoding detection period is too slow for battery saving use under the circumstances indicated. Such slow decoding would require that the normal battery on time would have to be of the order of 300 milliseconds rather than aforementioned 60 milliseconds in order to decode the tone. Where a common selectively tunable filter of high Q is employed which responds to incoming tones to tune itself to subsequent tones, a slow level detector is employed to detect the control tones without falsing, and a fast detection circuit is separately provided for initiating the control signal to stop the clock and render the receiver operative for the duration of the detected first tone. Thereafter, the slow detector is employed to generate control signals for maintaining the pulser in its on condition and for receiving the speech information transmitted to the pager.

Referring to FIG. 1 there is shown a receiver 1 coupled to an antenna 2 adapted to receive tone control signals, with or without speech, modulated onto a carrier which has been transmitted from a remote station. In a paging receiver the object is to have the paging equipment respond only to the preselected tone sequence associated with the paging equipment. When the sequence is detected, there is provided some sort of an indication, such as an audible tone, etc., which may be followed by the desired speech information. This is shown in FIG. 1 by having the output of receiver 1 coupled over lead 3 to an audio amplifier 4 before application to a loudspeaker 5 for broadcast. It should be noted that the audio amplifier operation is controlled by control signals developed on leads 6, 31 and 32 which will be described in greater detail hereafter. It is sufficient to say that no information is conveyed to the loudspeaker in the absence of a control signal. In order to reduce the power consumption in the pager application, there is provided a battery saver circuit 7 coupled to a battery source 8 and operating essentially as a switch to apply battery power over lead 9 to the receiver 1 in the form of pulses. In one embodiment the battery saver circuit operated to close the receiver battery lead for 60 milliseconds out of 600 milliseconds. The operation of the battery circuit is controlled by individual control signals developed on leads 10, 11 and 12. The control signals developed on leads 10 through 12 are developed in response to the control tones received by receiver 1 during its on period and selected by the tunable filter 13. Filter 13 is a bandpass filter whose bandpass frequency is modified in accordance with the incoming tone signals such that the filter selects first incoming tone signal and then uses this signal to retune the filter to the next tone in the sequence and so forth until the filter has been tuned to pass all of the tones in the sequence associated with the particular paging equipment. Functioning of this filter will be described shortly. Under the circumstances where a two tone control sequence is employed, a control signal is developed on lead 10 in response to the selection of tone A by the bandpass filter for the duration of tone A. The control signal developed on lead 11 in response to the selection of the A tone produces a control signal having a predetermined duration upon removal of the A tone. The control signal developed on lead 12 in response to the selection of a B tone has any one of several characteristics. For example, it could provide a signal for a second predetermined time interval or a control signal which continues for the duration of the B tone or a permanent control signal until it is manually removed. These various forms of operation will be disclosed shortly. It should be noted that in accordance with the present invention the control signal developed on lead 10 is developed in response to fast detection of the selected control tones by circuit 14 whereas the control signals developed on leads 11 and 12 occur in response to slow detection by circuit 15. Control circuit 27 which will be described in greater detail shortly provides control signals on leads 11 and 12 of the proper characteristic as well as providing control signals on leads 16, 17 and 18 for modifying the bandpass characteristic of the tunable filter to receive the incoming tones in a predetermined sequence.

For purposes of discussion it will be assumed that the arrangement of FIG. 1 is intended to detect two tones wherein the second or subsequent tone following the first tone can be one of two frequencies. For purposes of discussion the first tone will be referred to as the A tone and the second tone will be referred to either as B1 or B2. Let us assume that the incoming signal being received by receiver 1 during the on time established by the pulser circuit 7 is tone A followed by tone B1 followed by speech. In normal operation bandpass filter 19 has its bandpass frequency tuned to pass tone A after amplification and limiting in circuit 20. Since tone A is the desired first tone in the tone sequence associated with the paging equipment, it is desirable to operate the battery saver to the on position. Accordingly, the selected A tone after amplification in 21 is applied over lead 22 to the fast level-detector 14 which responds quickly to the onset of tone A to produce a control signal on lead 10 for the duration of the tone A detected by 14. This control signal is applied over OR gate 23 to clock 24. Clock 24 is a multivibrator which normally is operating with a duty cycle of 60 milliseconds on and 540 milliseconds off. Control signal 10 thus stops the clock in the on position for the duration of the detected A tone. Meanwhile slow level-detector 15 responds to the amplified A tone available on lead 20. The tone A available on lead 26 from the slow detector 15 is applied to a tone control circuit 27 to produce on lead 11 a second control signal which continues for a predetermined time after the termination of the detected A tone on lead 26. The second control signal on 11 applied over gate 23 to the clock 24 causes the clock to remain in its on position for said predetermined time interval in order that the receiver 1 may remain operative in order to receive the subsequent or second control tone. For purposes of discussion it shall be assumed that the filter 19 has previously been tuned under the control of a signal available from tone control 23 over lead 18 to operate frequency determining circuit 28 to cause the bandpass filter 19 to be tuned to tone A. Upon the occurrence of the second control signal, that is the one on lead 11, the signal on lead 18 is removed and a control signal on lead 17 is developed. This causes the frequency determining circuit 29 associated with frequency B1 to be switched into the bandpass filter in place of circuit 28, enabling the filter to select and pass the control tone B1. If, within a predetermined time less than the duration of the second control signal available on lead 11 a control tone B1 is not received, tone control circuit 27 operates to provide a signal over lead 16 to cause the frequency determining circuit 30 to be switched into the filter 19 to cause it to be selective of frequency B2. When B2 is switched in, B1 is switched out. As soon as one of the B tones has been detected by detector 15, control circuit 27 produces the third output control signal on lead 12. Depending upon the type of function permitted, more of which will be discussed later, the control signal on 12 causes the clock 24 to continue to apply battery to the receiver for the desired time. In addition, the signal applied over lead 6 to the audio amplifier 4 causes it to operate, in conjunction with signals available on leads 31 and 32 to pass the speech signals received by receiver 1 through audio amplifier 4 to the speaker 5. As long as the level-detector 15 is detecting a correct tone B, tone control 27 responds to this to provide an audio muting signal on lead 31 which interrupts the path from receiver 1 to the speaker 5. Concurrently with the development of the muting signal on lead 31, control circuit 27 generates an alarm signal of a given audio frequency which is applied over lead 32 to the audio stage 4 for reproduction in the loudspeaker 5. As soon as the detected B tone available on lead 27 disappears, the muting signal on lead 31 disappears and the tone alarm on lead 32 is removed. Removal of the signal on lead 31 permits the path from receiver 1 to be completed through the audio stage 4 to the loudspeaker under the control of the signal available on 6. In this manner, after the A and appropriate B tones have been properly detected, any following speech information is communicated to the loudspeaker. In the absence of the proper detection of the A and B tones in the correct sequence, no speech is able to reach the speaker 5. In this manner paging equipment is rendered ineffective to reproduce other than control tones and messages destined for it. The control signal on lead 6 may in certain instances be a function of the duration of the B tone. Alternatively, the control signal on lead 6 may be of a second predetermined duration different than the duration of the signal developed on lead 11. Also if desired, the signal on lead 6 may be permanent until it is manually removed as by operation of a switch.

Figure 2:
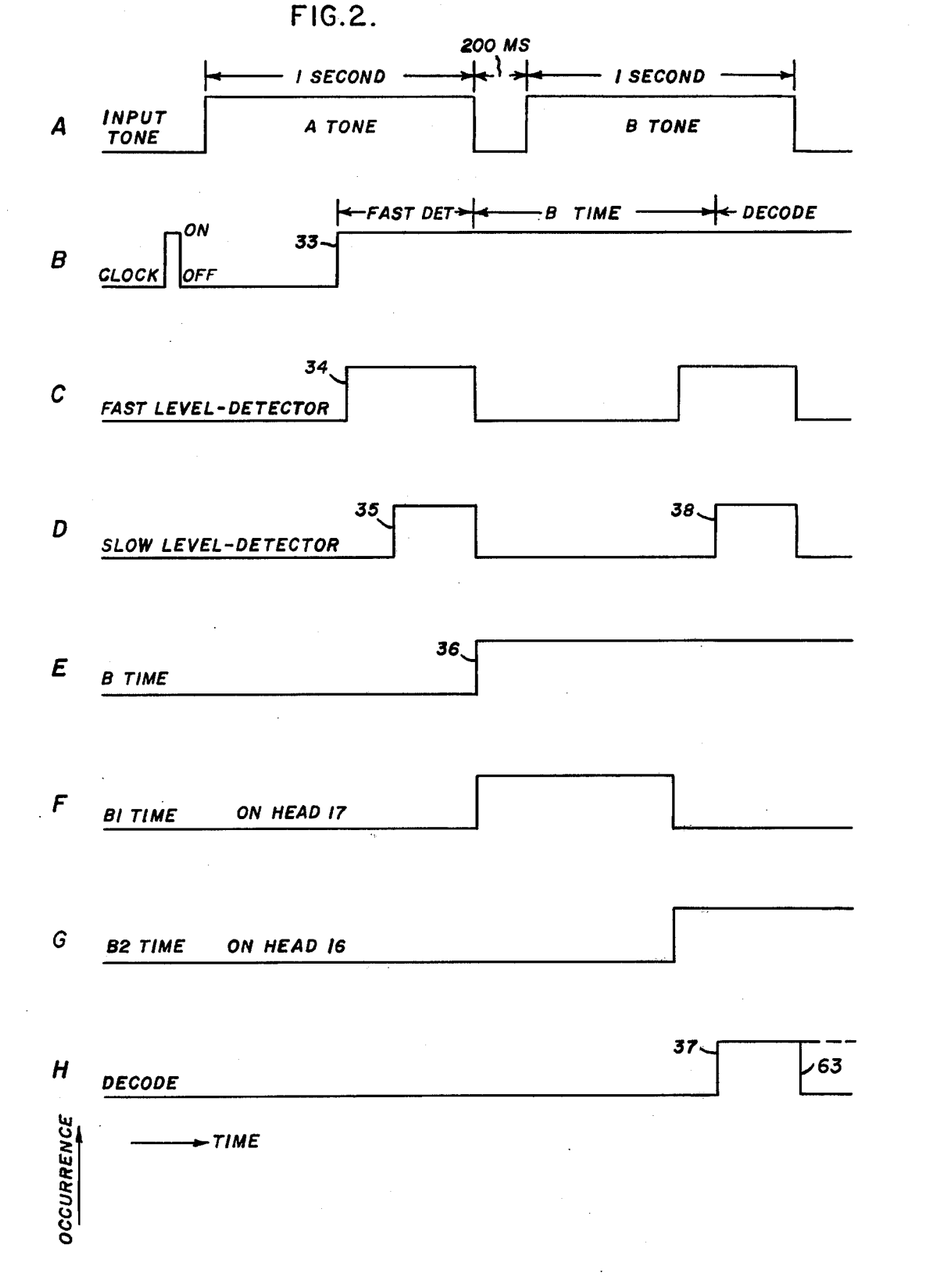
FIG. 2 illustrates certain wave forms useful in explaining the operation of the arrangement of FIG. 1.

Referring to FIG. 2, there is shown certain wave forms useful in explaining the operation of the arrangement of FIG. 1. In this figure, time is plotted as the ordinate and the occurrence of the timing signal or wave is plotted as the abscissa. GRAPH (a) illustrates reception of an A tone followed by a B tone each of one second duration with an interval of 200 milliseconds between these tones. GRAPH (b) illustrates the operation of the clock in the battery saver circuit 7 to produce clock pulses which are on for 60 milliseconds and off for 540 milliseconds. Under these circumstances the clock would generate a pulser output beginning during the A tone interval at time 33 shown in graph (b). The detected A tone output of the fast level-detector shown in graph (c) operates to produce a control signal 34 for substantially the remainder of the A tone. The clock responds to this signal 34 as shown in graph (b) to continue to supply continuous voltage for the period indicated between the brackets as fast-detector. Also at the end of the A tone the slow level-detector output drops out as shown in graph (d). When the slow level-detector signal 35 drops to zero, a B timer is initiated by control circuit 27 to produce the B timer signal 36. This holds the battery saver circuit in its on position for a predetermined time equal to that established by the B timer of control circuit 27. Wave form 36 switches off the control signal available on lead 18 which removes the tone A control circuit from the bandpass filter and transmits a B1 time signal on lead 17 which operates circuit 29 to tune the filter to the B1 frequency for the duration of the B1 time. At the conclusion of the B1 time, the B1 signal is removed and a B2 signal is developed on lead 16 which causes circuit 30 to tune the filter to the B2 frequency. If no B1 signal was being received under the circumstances indicated, the B timer would hold the clock open for a predetermined time interval. Upon the reception of a B2 tone by filter 19, the slow level-detector 15 would operate to produce an output 38 on lead 26. The tone control circuit 27 responding to this output would produce the decode control signal on leads 6 and 12 as shown at 37 which continues for a desired time interval which, as previously mentioned, could be one of several choices.

Figure 3:
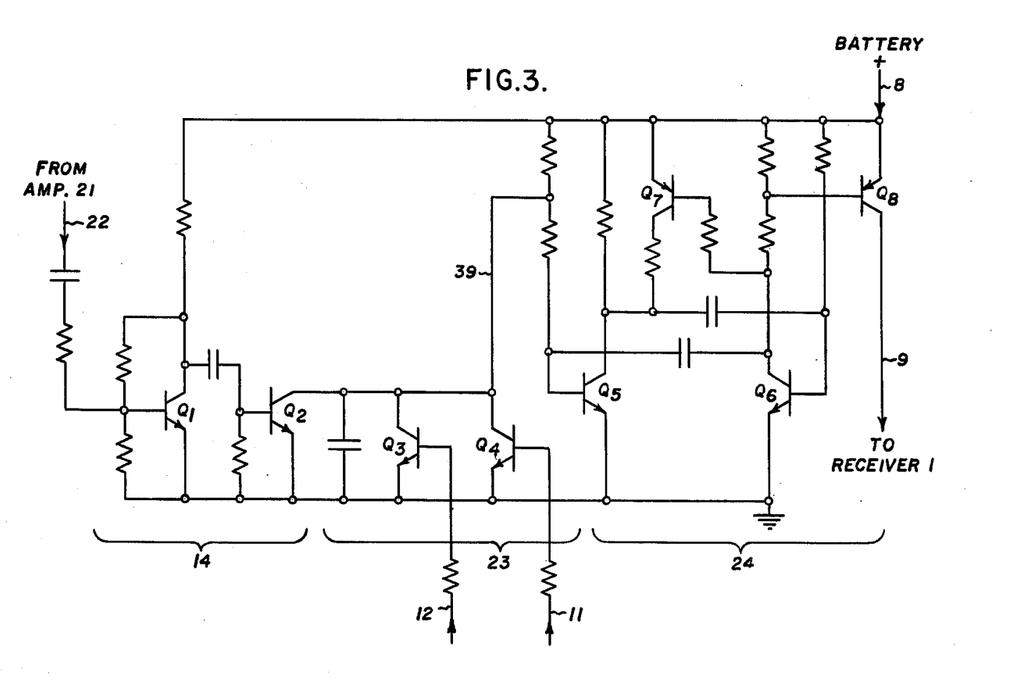
FIG. 3 illustrates in greater detail certain features of the battery saver circuit employed in the present invention and FIG. 4 illustrates certain details of the tone control circuit employed in the present invention and disclosed in FIG. 1.

Referring to FIG. 3 there is shown in greater detail the operation of the battery saver 7. The output from amplifier 21 is applied over lead 22 to the fast level-detector 14 whose output is then transmitted through the OR gate 23 to the clock 24. Clock 24 has applied to its input the battery voltage over lead 8. The output of clock 24 is supplied over lead 9 to the receiver 1. Level-detector 14 comprises a transistor Q1 acting as an amplifier. Transistor Q2 is connected as an amplifier detector to convert the AC tone signals available from Q1 to a DC signal. Q2, Q3 and Q4 operate as OR gates to pass either the fast detected signals available from 14 or the control signals available on leads 11 and 12 from the tone control circuit 27. Transistors Q5 and Q6 operate as a free running multivibrator which responds to the signal developed on lead 39 from one of the OR gates to stop the multivibrator in the on position. Under these circumstances transistor Q8 operates as a closed switch to connect the battery voltage available on lead 8 over the lead 9 to the receiver 1.

Figure 4:
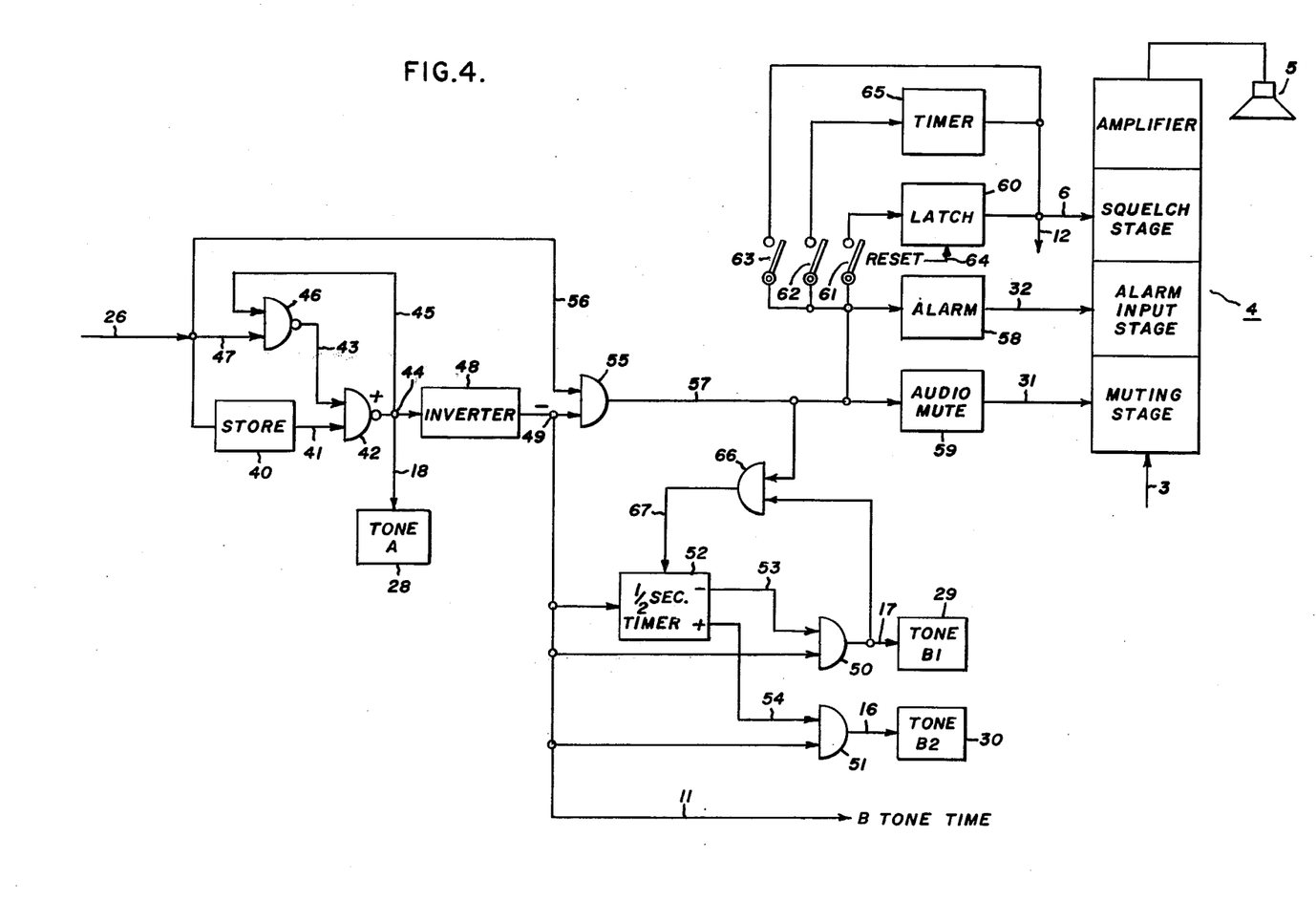

Referring to FIG. 4 there is shown in greater detail the operation of the tone control circuit 27 and the manner in which the signals developed on leads 31, 32 and 6 are applied to the audio stage 4 to control the utilization circuit or loudspeaker 5 with speech signals available on 3 and an alarm signal developed under control of the signal appearing on lead 32. It should be noted that the tone control circuit 27 has to produce a number of control signals. For example, it must supply the switching signals over leads 16 through 18 for controlling the tuning of the bandpass filter 19. It also must supply second and third control signals on leads 11 and 12 to control the pulser operation to insure that the pulser remains in the on position during the A and B tone time periods. Also circuit 27 must supply an alarm signal over lead 32 which can be audibly heard in the speaker 5 and mute reception of any signals on 3 from receiver. Upon termination of a valid B tone, the alarm is removed and the mute signal is also removed enabling the speech signals on 3 to be transmitted to the speaker. The control signal developed on 6 is normally blocked to prevent operation of the speaker. During the operative periods of the alarm signal, the signals developed on 6 permit the alarm signal to pass through the receiver to the speaker. The signal on 6 also unblocks the audio stage to pass the speech signal when the muting signal is removed from 31. The signal on 6 which completes the audio circuit to the speaker stays in the on position for any one of a number of desired periods. For example, in one instance it would remain permanently on until the switch is reset or it could remain on automatically for a period which is a function of the B tone duration or it could remain for a fixed period of time as established by a timer. These features will be shown and discussed in greater detail shortly.

In normal operation the bandpass filter is tuned for example to tone A with a positive going signal developed on lead 18. Under these circumstances the bandpass filter 19 is tuned to select the A tone should it appear at the receiver. When an A tone is received, the level detector produces a positive going signal on lead 26. This positive going signal representative of the detection of the A tone is stored in storage circuit 40. The positive going signal developed in storage circuit 40 applied over lead 41 to the inverting AND gate 42 is prevented from passing through the AND gate because of a negative signal developed on lead 43. This negative signal is developed as a result of a positive signal being developed at junction 44 in its normal state. This positive going signal is applied over lead 45 to the inverting AND gate 46 whose other input on lead 47 has the positive going signal available on lead 26. This results in a negative signal being developed on lead 43 blocking the inverting AND gate 42. Upon termination of the positive going signal on lead 26 at the end of the A tone period, lead 47 goes negative and lead 43 goes positive permitting the positive going signal available on lead 41 as a result of storage in circuit 40 to pass through the AND gate 42 to the inverter circuit. With junction 44 going negative the tone A control circuit 28 is removed from effecting the tuning of bandpass filter 19. The positive going signal developed at junction 49 primes the AND gates 50 and 51 whose other inputs are connected to the half second timer circuit 52. In its initial state the timer 52 provides a negative going signal on lead 53 to AND gate 50 and a positive going signal on lead 54 to AND gate 51. When the junction 49 goes positive, timer 52 operates to produce a positive going signal on lead 53 and a negative going signal on 54 for one-half second duration. During this one-half second period the AND gate 50 responds to the positive going signals available on its input leads to produce a positive signal on its output lead 17. This positive going signal causes the B1 tone control circuit to be switched into the bandpass filter and cause it to now selectively receive B1 tones. At the end of the one-half second period established by timer 52, the polarity of the signals at its output lead switches again. This causes gate 50 to close, thereby removing the tone control circuit B1 and causes a positive going signal to be developed on lead 16 causing the tone control circuit B2 to be inserted into the bandpass filter to selectively pass B2 tones for the remainder of the B tone period of one second duration.

Thus far we have described the tuning of the selective filter without consideration of whether B1 or B2 tones were present. The positive going signal on junction 49 primed the AND gate 55. In the absence of a tone, a negative going signal on lead 26 is applied to gate 55 over lead 56 and no decoding occurs. However, upon the selection of a B1 or B2 tone, a positive signal is developed on lead 26 and applied over lead 56 to the AND gate 55 resulting in a positive going signal being developed on lead 57. The positive going signal on lead 57 indicates that a proper B tone has been detected. The decoded B tone signal on lead 57 is employed to perform a number of functions. Initially, it operates the alarm circuit 58 to produce an audible tone over lead 32 for application to the alarm stage of audio circuit 4. Simultaneously it causes audio mute circuit 59 to supply a signal over lead 31 to block the application of signals available from receiver 1 on lead 3 to the speaker. The same signal on lead 57 is employed to enable the audio circuit 4 to pass the alarm signal developed by circuit 58 to the transmitter 5 or the speech signals available on lead 3. If switch 61 is closed and 62 and 63 are open, the positive going signal available on lead 57 causes the latch 60 to close permanently thereby applying a signal over lead 6 to a squelch portion of the audio stage 4 which enables the alarm signals and the audio signals on 3 to be passed to the speaker for as long as desired. A manual reset control is provided at 64 to restore the latch to its open circuit position. Alternatively, if switch 62 is closed and 61 and 63 remain open, the positive going signal on lead 57 causes the timer circuit 65 to produce a signal on lead 6 for a predetermined time interval. This can be any time period but normally is selected to pass a given interval of speech, say of the order of 30 seconds. Obviously if longer duration speech signals are desired, the timer output can be modified accordingly. Finally, if switch 63 is closed and switches 61 and 62 are open, the positive going signal on lead 57 is applied directly to lead 6 causing the squelch stage to pass the alarm signal developed on 32 for the rest of the B tone signal. Under these circumstances, of course, no voice is heard since the voice signals appear after the B tone has been discontinued. This last named feature would be useful in the circumstances where transmissions were arranged so that only control tones were transmitted. Receipt of the proper control tones would operate the alarm merely notifying the operator that he is being paged. He would then turn to other means for receiving the message. Thus, the system would then normally be a tone paging system, without voice message transmission.

The discussion has preceded thus far with the assumption that a B tone has been received. It should be noted that one of two B tone signals could have been received and result in proper operation. Use of two B tones is useful in an arrangement where one B tone is associated with selective, individual calling and the other B tone is involved in selective calling of groups of receivers. Assuming the B1 tone is detected on lead 26, the positive going signal applied over lead 56 causes gate 55 to open and produce a positive going signal on its output lead 57. Normally the timer 52 would have timed out at the end of the one-half second. However, with the positive going input available from gate 50 and the positive going signal available from lead 57, AND gate 66 responds to produce a positive going signal on its output lead 67 holding the timer 52 operative for the remainder of the B tone period or one second. In the case where no B1 tone was detected, the timer 52 resets at the end of the one-half second time period. This causes a positive going signal to be developed on lead 16. The positive going signal on lead 16 remains for the duration of the positive going signal developed at junction 49. This signal is a function of the operation of the storage circuit 40. Storage circuit 40 is designed to apply a positive going voltage over lead 41 to gate 42 for approximately one second following the termination of the positive going signal developed on lead 26. Thus the control circuit 27 operates to insert either of the frequency controlling circuits 29 and 30 into the tunable filter 19 at the proper times and for the proper duration. FIG. 2 illustrates the situation where switch 63 was closed and 61 and 62 open such that at the termination of the B timer signal output, the pulser resumed its "on-off" operation again. On the other hand if switches 61 or 62 were closed, and the others open, the pulser would not resume its "on-off" operation until the latch 60 is manually reset by 64 or timer 65 times out, respectively.

The embodiment disclosed and discussed here and above may be modified by those skilled in the art. It is contemplated in the appended claims to include all such modifications which come within the spirit and scope of the teachings herein.

What I Claim as new and desire to secure by Letters Patent of the United States is:

1. A communication receiver for receiving carrier signals modulated by a series of control tones, said receiver comprising a processing circuit for receiving the modulated carrier signals and detecting the series of modulated control tones therein, a pulser circuit coupled to said processing circuit and operative to normally provide a series of recurrent voltage pulses to said processing circuit for intermittently rendering said processing circuit operative at a predetermined rate, a decoder circuit coupled to said processing circuit and responsive to the first control tone in said series of control tones for generating a first control signal having a duration which is a function of the duration of the first control tone and a second control signal which occurs substantially upon the termination of said first control tone and continues for a predetermined time interval thereafter, said decoder circuit responsive to a subsequent control tone for generating a third control signal, said pulser circuit responsive to said first control signal to furnish a continuous supply voltage to said processing circuit for the duration of said first control tone, said pulser circuit responsive to said second control signal to furnish a continuous supply voltage to said processing circuit for at least said predetermined time interval, said predetermined time interval having a duration sufficient to permit the decoder to decode said subsequent tone, an electronic circuit responsive to said third control signal to provide an enabling signal, and a utilization circuit responsive to said enabling signal for utilizing said enabling signal.

2. An arrangement according to claim 1 further comprising said pulser circuit responsive to said third control signal to furnish a continuous supply voltage for a desired time period.

3. An arrangement according to claim 2 wherein said desired time period comprises a second predetermined time period.

4. An arrangement according to claim 2 wherein said desired time period is a function of the duration of said subsequent tone.

5. An arrangement according to claim 2 wherein said desired time period is permanent until manually removed.

6. An arrangement according to claim 3 wherein the enabling signal occurs for a second predetermined time interval.

7. An arrangement according to claim 4 wherein said enabling signal has a duration which is a function of the second control tone duration.

8. An arrangement according to claim 5 wherein said enabling signal is permanent until said first mentioned manual removal.

9. In combination, first means for receiving speech signals and control tone signals, second means for detecting received control tone signals, a pulser circuit coupled to said second means and operative to normally furnish a series of recurrent pulses to said first means for intermittently rendering said first means operative at a predetermined rate, said second means responsive to a detected first control tone in a series of control tones for generating a first control signal for a duration which is a function of the duration of said detected first control tone and a second control signal which occurs substantially upon the termination of said detected first control tone and continues for a predetermined time interval thereafter, said second means responsive to a detected subsequent control tone for generating a third control signal, said pulser circuit responsive to said first control signal to furnish a continuous supply voltage to said first means for the duration of said first control signal, said pulser circuit responsive to said second control signal to furnish a continuous supply voltage to said second means for the duration of said second control signal, third means normally inoperative for utilizing said received speech signals, and fourth means responsive to said third control signal for rendering said third means operative.

10. An arrangement according to claim 9 wherein said second means comprises a common detector which is tunable to detect said first control tone or said subsequent control tone, means responsive to said detected first control tone for tuning said second means to detect said subsequent control tone, and means responsive to the termination of said second control signal for tuning said second means to detect said first control tone.

11. In combination, first means for receiving speech and control tones, tunable filter means for selecting said control tones, second means for detecting said selected control tones, a pulser circuit coupled to said first means for normally intermittently rendering said first means operative at a predetermined rate, said tunable filter means comprising a high Q circuit in order to select closely spaced control tones, said second means comprising a fast level-detector and a slow level-detector, said fast level-detector responsive to the first control tone selected for generating a first control signal having a duration which is a function of the duration of said first control tone, said slow level-detector responsive to said selected first control tone for providing a second control signal which occurs substantially upon the termination of said first selected control tone and continues for a predetermined time interval thereafter, said slow level-detector responsive to a subsequent control tone for generating a third control signal, said pulser circuit responsive to said first control signal to render said first means operative for the duration of said first control signal, said pulser circuit responsive to said second control signal to render said first means operative for at least said predetermined time interval, means responsive to the selected first control tone detected by said slow level-detector for tuning said tunable filter means to select said subsequent control tone and responsive to a selected subsequent control tone detected by said slow level-detector for tuning said tunable filter means to select said first control tone, and means responsive to said third control signal for utilizing said received speech.

12. In combination, first means for receiving speech and sequential control tones, tunable filter means coupled to said first means for selectively passing said control tones individually, second means coupled to said filter means for detecting said selectively passed control tones, a pulser circuit normally providing pulse signals at a given recurrence rate coupled to said first means for recurrently rendering said first means operative at said given recurrence rate, said tunable filter means comprising a high Q circuit in order to selectively pass closely spaced control tones, said second means comprising a fast level-detector and a slow level-detector, said fast level-detector responsive to the first selectively passed control tone for generating a first control signal having a duration which is a function of the duration of said first control tone, said slow level-detector responsive to said selectively passed first control tone for providing a second control signal which occurs substantially upon the termination of said first selected control tone and continues for a predetermined time interval thereafter, said slow level-detector responsive to a selectively passed, subsequent second control tone for generating a third control signal, said purser circuit responsive only to said first control signal to interrupt the rendering of said first means operative at said given recurrence rate and to render said first means operative for the duration of said first control signal, said pulser circuit responsive to said second control signal to additionally render said first means operative for at least said predetermined time interval, means responsive to the selectively passed first control tone detected by said slow level-detector for automatically tuning said tunable filter means to selectively pass said subsequent second control tone and responsive to a selectively passed, subsequent, second control tone detected by said slow level-detector for automatically tuning said tunable filter means to selectively pass said first control tone, and normally operative means responsive only to said third control signal for utilizing said received speech.

13. In combination, first means for receiving speech and sequential control tones, second means coupled to said first means for selectively passing control tones one at a time, third means coupled to said second means for detecting said selectively passed control tones, a pulser circuit coupled to said first means for normally rendering said first means intermittently operative at a given recurrence rate, said third means responsive to a first selectively passed tone for generating a first control signal having a duration which is a function of the duration of said first control tone, said third means responsive to said selectively passed first control tone for providing a second control signal which occurs substantially upon the termination of said first selected control tone and continues for a predetermined time interval thereafter, said third means responsive to a selectively passed, subsequent, second control tone for generating a third control signal, said pulser circuit responsive to said first control signal to render said first means continuously operative for the duration of said first control signal, said pulser circuit responsive to said second control signal to render said first means continuously operative for at least said predetermined time interval, means responsive to the selectively passed first control tone detected by said third means for automatically changing the selectivity of said second means to selectively pass said subsequent, second control tone, means responsive to the selectively passed, subsequent, second control tone detected by said third means for automatically changing the selectivity of said second means to selectively pass said first control tone, and normally inoperative means responsive only to said third control signal for utilizing said received speech.

14. In combination, first means for receiving speech and sequential control tones, second means coupled to said first means for selectively passing a plurality of given tones in a sequence, third means coupled to said second means for detecting said selectively passed control tones, fourth means coupled to said first means for normally recurrently pulsing said first means with power to render said first means recurrently operative, said third means responsive to only a first selectively passed tone for generating a first control signal having a duration which is a function of the duration of said first control tone, said third means responsive only to said selectively passed first control tone for providing a second control signal which occurs substantially upon the termination of said first selected control tone and continues for a predetermined time interval thereafter, said third means responsive to only a selectively passed, subsequent, control tone for generating a third control signal, said fourth means responsive to said first control signal to render said first means continuously operative for the duration of said first control signal, said fourth means responsive to said second control signal to render said first means continuously operative for at least said predetermined time interval, fifth means responsive to said selectively passed first control tone detected by said third means for automatically changing the selectivity of said second means to selectively pass said subsequent control tone and sixth means responsive to said selectively passed, subsequent, control tone detected by said third means for automatically changing the selectivity of said second means to selectively pass said first control tone, and normally inoperative means responsive to said third control signal for utilizing said received speech.

15. An arrangement according to claim 14 wherein said fifth means comprises means responsive to said selectively passed first control tone for automatically changing the selectivity of said second means for a first predetermined time interval to selectively pass a first subsequent control tone and for a subsequent second predetermined time interval to selectively pass a second subsequent control tone, and means coupled to said third means responsive to the detection of a first subsequent control tone to arrest the automatic changing of the selectivity of said second means to pass a second subsequent control tone, said third means responsive only to the first, selectively passed, subsequent, control tone for generating said third control signal.

* * * * *